United States Patent
Crosland et al.

(10) Patent No.: US 7,350,178 B1
(45) Date of Patent: Mar. 25, 2008

(54) EMBEDDED PROCESSOR WITH WATCHDOG TIMER FOR PROGRAMMABLE LOGIC

(75) Inventors: Andrew Crosland, Haddenham (GB); Roger May, Bichester (GB); Edward Flaherty, Kingston Bagpuize (GB); Andrew Draper, Chesham (GB)

(73) Assignee: Altera Corporation, San Jose, CA (US)

( * ) Notice: Subject to any disclaimer, the term of this patent is extended or adjusted under 35 U.S.C. 154(b) by 556 days.

(21) Appl. No.: 10/711,137

(22) Filed: Aug. 27, 2004

Related U.S. Application Data

(62) Division of application No. 09/880,734, filed on Jun. 12, 2001.

(60) Provisional application No. 60/211,094, filed on Jun. 12, 2000.

(51) Int. Cl.
*G06F 17/50* (2006.01)
(52) U.S. Cl. .......................................... 716/17; 716/16
(58) Field of Classification Search .................. 716/16, 716/17, 8–10
See application file for complete search history.

(56) References Cited

U.S. PATENT DOCUMENTS

| | | | |
|---|---|---|---|
| 4,488,259 A | 12/1984 | Mercy | |
| 4,617,479 A | 10/1986 | Hartmann et al. | |
| 4,710,927 A | 12/1987 | Miller | |
| 4,796,211 A * | 1/1989 | Yokouchi et al. | 714/55 |
| 4,871,930 A | 10/1989 | Wong et al. | |
| 5,241,224 A | 8/1993 | Pedersen et al. | |
| RE34,444 E | 11/1993 | Kaplinsky | |
| 5,258,668 A | 11/1993 | Cliff et al. | |
| 5,260,610 A | 11/1993 | Pedersen et al. | |
| 5,260,611 A | 11/1993 | Cliff et al. | |
| 5,412,260 A | 5/1995 | Tsui et al. | |
| 5,436,575 A | 7/1995 | Pedersen et al. | |
| 5,479,618 A * | 12/1995 | Van de Steeg et al. | 700/23 |
| 5,550,782 A | 8/1996 | Cliff et al. | |

(Continued)

OTHER PUBLICATIONS

Aitken, R.C., and Agarwal, V.K,, "A Diagnosis Method Using Pseudo-Random Vectors Without Intermediate Signatures," Proc. of Int. Conf. on Computer-Aided Design (ICCAD), IEEE pp. 574-577 (1989).

(Continued)

*Primary Examiner*—Jack Chiang
*Assistant Examiner*—Magid Y. Dimyan
(74) *Attorney, Agent, or Firm*—Townsend and Townsend and Crew LLP

(57) ABSTRACT

A programmable logic integrated circuit has an embedded processor with a watchdog timer circuit. The watchdog timer circuit is used to detect software or hardware failures. In one implementation, the watchdog timer circuit includes a counter register that advances (e.g., incremented or decremented) with each clock. To prevent the watchdog timer circuit from becoming triggered, the watchdog timer circuit should be reset or reloaded by software. For example, the count register may be reset to a value to start the count over. If the count register is allowed to count to a final or maximum value, the watchdog timer circuit will become triggered, generating a triggered signal that causes the programmable logic integrated circuit to be reset. A reset causes a reloading of the configuration data used to program the programmable logic and embedded processor portions of the integrated data. The configuration data may be stored in an external nonvolatile storage memory.

21 Claims, 11 Drawing Sheets

U.S. PATENT DOCUMENTS

| | | | |
|---|---|---|---|
| 5,590,343 A * | 12/1996 | Bolan et al. | 713/300 |
| 5,604,680 A * | 2/1997 | Bamji et al. | 716/8 |
| 5,687,325 A | 11/1997 | Chang | |
| 5,790,479 A | 8/1998 | Conn | |
| 5,970,254 A | 10/1999 | Cooke | |
| 6,096,091 A * | 8/2000 | Hartmann | 716/17 |
| 6,097,211 A | 8/2000 | Couts-Martin et al. | |
| 6,230,181 B1 * | 5/2001 | Mitchell et al. | 718/100 |
| 6,233,205 B1 | 5/2001 | Wells et al. | |
| 6,260,087 B1 | 7/2001 | Chang | |
| 6,389,579 B1 * | 5/2002 | Phillips et al. | 716/6 |
| 6,438,684 B1 * | 8/2002 | Mitchell et al. | 713/1 |
| 6,467,009 B1 | 10/2002 | Winegarden | |
| 6,615,167 B1 * | 9/2003 | Devins et al. | 703/28 |
| 6,708,325 B2 * | 3/2004 | Cooke et al. | 717/124 |
| 2005/0040850 A1 * | 2/2005 | Schultz et al. | 326/41 |
| 2005/0229020 A1 * | 10/2005 | Goodman et al. | 714/2 |
| 2005/0235355 A1 * | 10/2005 | Dybsetter et al. | 726/22 |

OTHER PUBLICATIONS

Altera "APEX 20K Programmable Logic Device Family Data Sheet," May 1999, 7 pages total.

Altera "FLEX 10K Embedded Programmable Logic Family Data Sheet," May 1999, 7 pages total.

Altera "FLEX 8000 Programmable Logic Device Family Data Sheet," May 1999, 5 pages total.

Altera "IEEE 1149.1 (JTAG) Boundary-Scan Testing in Altera Devices," Aug. 1999, Application Note 39, 29 pages total.

Altera "MAX 7000 Programmable Logic Device Family Data Sheet," May 1999, 6 pages total.

"AT94K Series Field Programmable System Level Integrated Circuit," Advance Information Brochure of Atmel Corporation, Dec. 1999, 6 pages.

"CS2000 Reconfigurable Communications Procssor Family Product Brief," Advance Product Information from ChameleonSystems, Inc., 2000, pp. 1-8.

DeHon, DPGA-Coupled Microprocessors: Commodity ICs for the Early 21st Century, Artificial Intelligence Laboratory, Massachusetts Institute of Technology, Cambridge, MA, IEEE, Feb. 1994, pp. 31-33.

Ghosh-Dastidar, J., and Touba, N.A., "A Rapid and Scalable Diagnosis Scheme for BIST Environments With a Large Number of Scan Chains," Proc. of IEEE VLSI Test Symposium, pp. 79-85 (2000).

Ghosh-Dastidar, J., Das, D., and Touba, N.A., "Fault Diagnosis in Scan-Based BIST using Both Time and Space Information," Proc. of International Test. Conf., IEEE, pp. 95-102 (1999).

Hauser, and Wawrzynek, University of California, Berkeley, "Garp: A MIPS Processor with a Reconfigurable Coprocessor," IEEE Apr. 1997, pp. 12-21.

IBM Corporation, "Mixture of Field and Factory Programmed Logic Cells in a Single Device," IBM Technical Disclosure Bulletin, Apr. 1995, pp. 499-500.

Mc Anney, M.G. and Savir, J., "There is Information in Faulty Signatures," Proc. of International Test Conf., IEEE, pp. 630-636 (1987).

"Motorola Technical Developments," Magazine of Motorola, Inc., vol. 39, Sep. 1999, pp. i-vii and 77-80.

Nagel, "ACM Computing Surveys: Synergy Between Software and Hardware," Carnegie Mellon University, Department of Electrical Engineering and Computer Science, Pittsburgh, PA, Dec. 1996, pp. 1-3.

Razdan, and Smith, "A High-Performance Microarchitecture with Hardware-Programmable Functional Units," Harvard University, Cambridge, MA, Digital Equipment Corporation, Hudson, MA, Nov. 1994, pp. 172-180.

"Triscend E5 Configurable System-on-Chip Family," Product Description from Triscend Corporation, Jan. 2000 (Version 1.00), pp. i-ii and 1-90.

"Wireless Base Station Design Using Reconfigurable Communications Processors," Wireless Base Station White paper from ChameleonSystems, Inc., 2000, pp. 1-8.

Wittig, and Chow, "One Chip" An FPGA Processor With Reconfigurable Logic, Department of Electrical and Computer Engineering, University of Toronto, Ontario, Canada, IEEE, Sep. 1996, pp. 126-135.

Wynn, "In-Circuit Emulation for ASIC-Based Designs," Xilinx, Inc., VLSI Systems Design, Oct. 1986, pp. 38-39, and 42-45.

* cited by examiner

EMBEDDED PROCESSOR WITH WATCHDOG TIMER FOR PROGRAMMABLE LOGIC

This application is a divisional of U.S. patent application Ser. No. 09/880,734, filed Jun. 12, 2001, which claims the benefit of U.S. provisional patent application 60/211,094, filed Jun. 12, 2000, which are incorporated by reference along with all other documents listed in this application.

BACKGROUND OF THE INVENTION

The present invention relates to the field of integrated circuits and in particular, to a system on a programmable chip (SOPC) architecture where programmable logic and an embedded processor are incorporated in a single programmable logic integrated circuit to provide greater functionality and performance.

Integrated circuits are important building blocks of the modern age. Technology continues to evolve and integrated circuits continue to provide improved functionality. As integrated circuits improve, so do the electronics systems that are built using integrated circuits. There are many types of integrated circuit such as memories, microprocessors, application specific integrated circuits (ASICs), and programmable logic. Programmable logic integrated circuits such as PALs, PLDs, FPGAs, LCAs, and others are becoming more complex and continually evolving to provide more user-programmable features on a single integrated circuit. Modern programmable logic integrated circuits incorporate programmable logic including logic gates, products terms, or look-up tables. Programmable logic integrated circuits also included embedded user-programmable memory or RAM.

Despite the success of programmable logic, there is a continuing desire to provide greater functionality in a programmable logic integrated circuit, but at the same time, provide greater performance. The programmable logic of a programmable logic integrated circuit may be configured to emulate a processor, such as an Intel microprocessor or other central processing unit (CPU). However, when a processor implemented in programmable logic, that programmable logic cannot be used for other purposes, and also the performance of a hardware-implemented processor is still greater. Incorporating an embedded processor within a programmable logic integrated circuit will provide users with greater functionality and allow functionality not available when only programmable logic is available.

Therefore, there is a need to provide a programmable logic integrated circuit having an embedded processor.

SUMMARY OF THE INVENTION

The invention is a programmable logic integrated circuit with an embedded processor having a watchdog timer circuit. The watchdog timer circuit is used to detect software or hardware failures. In one implementation, the watchdog timer circuit includes a counter register that advances (e.g., incremented or decremented) with each clock. To prevent the watchdog timer circuit from becoming triggered, the watchdog timer circuit should be reset or reloaded by software. For example, the count register may be reset to a value to start the count over. If the count register is allowed to count to a final or maximum value, the watchdog timer circuit will become triggered, generating a triggered signal that causes the programmable logic integrated circuit to be reset. A reset causes a reloading of the configuration data used to program the programmable logic and embedded processor portions of the integrated data. The configuration data may be stored in an external nonvolatile storage memory.

In an embodiment, the invention is a method of operating a programmable logic integrated circuit. An initial value is loaded in a count register of a watchdog timer circuit of the programmable logic integrated circuit. The count register is clocked to advance it to a next value with each clock. The watchdog timer circuit may increment or decrement the stored count value at each clock pulse. The count register is periodically reloaded with the initial value. When the stored count value held in the count register of the watchdog timer circuit reaches a final value, a triggered signal output is asserted. The final value may cause an overflow condition in the count register of the watchdog timer circuit. The initial value may be 0 and the final value may be a maximum count value permitted by the count register. Upon receiving the triggered signal output in a reset logic block of the programmable logic integrated circuit, configuration data from an external source will be reloaded into the programmable logic integrated circuit. The external source may be a nonvolatile memory, such as a serial EPROM. Furthermore, in an implementation, the configuration data is used to configure an embedded processor portion and a programmable logic portion of the programmable logic integrated circuit In one implementation, periodically reloading the count register includes writing a magic value into a reload register of the watchdog timer circuit. When the magic value is received in the reload register, the count register of the watchdog timer circuit is reset to the initial value. In another implementation, periodically reloading the count register includes writing a first magic value into a reload register of the watchdog timer circuit. When the first magic value is received in the reload register, the count register of the watchdog timer circuit is reloaded to the initial value. After the first magic value is received in the reload register, a subsequent reload of the count register is permitted when a second magic value is written into reload register. Continually reloading the count register to the initial value occurs by writing the first and second magic values to the reload register in sequence, alternately.

To avoid asserting the triggered signal output, a periodic reload of the watchdog timer circuit should be performed during a time period it takes the watchdog timer circuit to count from the initial value to the final value. This time period will depends on clock frequency used to clock the watchdog timer circuit. In one implementation, the period is less than about two minutes. The count register may be 32 bits wide.

In another embodiment, the invention is a method of designing a programmable logic integrated circuit including taking a first layout of a programmable logic integrated circuit. The first layout is stretched using an edge of the first layout so the first layout has a stretched section. A second layout contains an embedded processor stripe for a programmable logic integrated circuit, where the embedded processor stripe includes a watchdog timer circuit. The second layout is incorporated into the stretched section of the first layout. Signal lines of the first layout are connected to signal lines of the second layout.

In another embodiment the invention is a method including designing a layout of an embedded processor stripe to be incorporated into a programmable logic integrated circuit, where the layout includes a watchdog timer circuit. Signal lines in the layout of the embedded processor stripe are to be connected to signal lines of a programmable logic portion of the programmable logic integrated circuit. This stripe may be designed to be placed or positioned at an edge of the programmable logic integrated circuit.

In another embodiment, the invention is a circuit including a programmable logic integrated circuit having an embedded processor portion and a programmable logic portion, where the embedded processor portion includes a watchdog timer circuit. An external configuration source integrated circuit is connected to the programmable logic integrated circuit. This external configuration sources stores configuration information for the programmable logic integrated circuit. When the watchdog timer circuit of the programmable logic integrated circuit asserts a triggered signal output due to not reloading the watchdog timer circuit within a timeout period, configuration data is loaded from the external configuration source into the programmable logic integrated circuit.

The external configuration source may be a nonvolatile memory. The watchdog timer circuit may be reloaded by periodically loading a reload register of the watchdog timer with one or more magic values. Configuration of the programmable logic of the programmable logic integrated circuit may be held within volatile memory cells, such as SRAM cells. Configuration data from the external configuration source may be used to configure the embedded processor portion and programmable logic portion of the programmable logic integrated circuit.

In another embodiment, the invention is programmable logic integrated circuit including a programmable logic portion of the integrated circuit having a plurality of logic array blocks, configurable to perform user logic, where the logic array blocks are arranged in rows and columns. An embedded processor portion of the integrated circuit is connected to the programmable logic portion. The embedded processor portion includes a watchdog timer circuit which is triggered if a count register of the watchdog timer circuit is permitted to count to a final value before the count register is reloaded. The watchdog timer circuit may further include a reload register and a control register.

In another embodiment, the invention is a method of operating a programmable logic integrated circuit including clocking a watchdog timer circuit to advance a count register of the watchdog timer circuit. A first magic value is loaded into a reload register of the watchdog timer circuit, which resets the count register to an initial value. After loading the first magic value, a second magic value is loaded into the reload register, which causes the count register to reset the initial value. After loading the first magic value into the reload register, a value other than the second magic value is loaded into the reload register, which causes the watchdog timer circuit to generate a triggered signal. Furthermore, allowing the count register of the watchdog timer to advance to a final value before the first or second magic values are loaded causes the watchdog timer circuit to generate the triggered signal. The first and second magic values may be different from another. The initial value may be any value including zero.

Other objects, features, and advantages of the present invention will become apparent upon consideration of the following detailed description and the accompanying drawings, in which like reference designations represent like features throughout the figures.

DETAILED DESCRIPTION

Figure 1:
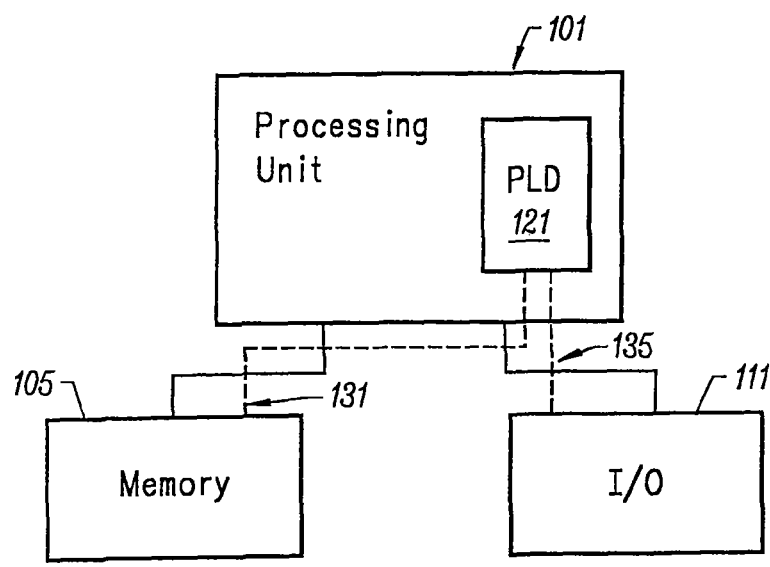
FIG. 1 is diagram of a digital system with a programmable logic integrated circuit.

FIG. 1 shows a block diagram of a digital system within which the present invention may be embodied. The system may be provided on a single board, on multiple boards, or even within multiple enclosures. FIG. 1 illustrates a system 101 in which a programmable logic device 121 may be utilized. Programmable logic devices or programmable logic integrated circuits are sometimes referred to as a PALs, PLAs, FPLAs, PLDs, CPLDs, EPLDs, EEPLDs, LCAs, or FPGAs and are well-known integrated circuits that provide the advantages of fixed integrated circuits with the flexibility of custom integrated circuits. Such devices allow a user to electrically program standard, off-the-shelf logic elements to meet a user's specific needs. See, for example, U.S. Pat. No. 4,617,479, incorporated by reference for all purposes. Programmable logic devices are currently represented by, for example, Altera's MAX®, FLEX®, and APEX™ series of PLDs. These are described in, for example, U.S. Pat. Nos. 4,871,930, 5,241,224, 5,258,668, 5,260,610, 5,260,611, 5,436,575, and the *Altera Data Book*(1999), all incorporated by reference in their entirety for all purposes. Programmable logic integrated circuits and their operation are well known to those of skill in the art.

In the particular embodiment of FIG. 1, a processing unit 101 is connected to a memory 105 and an I/O 11 and incorporates a programmable logic device (PLD) 121. PLD 121 may be specially connected to memory 105 through connection 131 and to I/O 11 through connection 135. The system may be a programmed digital computer system, digital signal processing system, specialized digital switching network, or other processing system. Moreover, such systems may be designed for a wide variety of applications such as, merely by way of example, telecommunications systems, automotive systems, control systems, consumer electronics, personal computers, Internet communications and networking, and others.

Processing unit 101 may direct data to an appropriate system component for processing or storage, execute a program stored in memory 105 or input using I/O 111, or other similar function. Processing unit 101 may be a central processing unit (CPU), microprocessor, floating point coprocessor, graphics coprocessor, hardware controller, microcontroller, programmable logic device programmed for use as a controller, network controller, or other processing unit. Furthermore, in many embodiments, there is often no need for a CPU. For example, instead of a CPU, one or more PLDs 121 may control the logical operations of the system. In an embodiment, PLD 121 acts as a reconfigurable processor, which can be reprogrammed as needed to handle a particular computing task. In some embodiments, processing unit 101 may even be a computer system. Memory 105 may be a random access memory (RAM), read only memory (ROM), fixed or flexible disk media, PC Card flash disk memory, tape, or any other storage retrieval means, or any combination of these storage retrieval means. PLD 121 may serve many different purposes within the system in FIG. 1. PLD 121 may be a logical building block of processing unit 101, supporting its internal and external operations. PLD 121 is programmed to implement the logical functions necessary to carry on its particular role in system operation.

Figure 2:
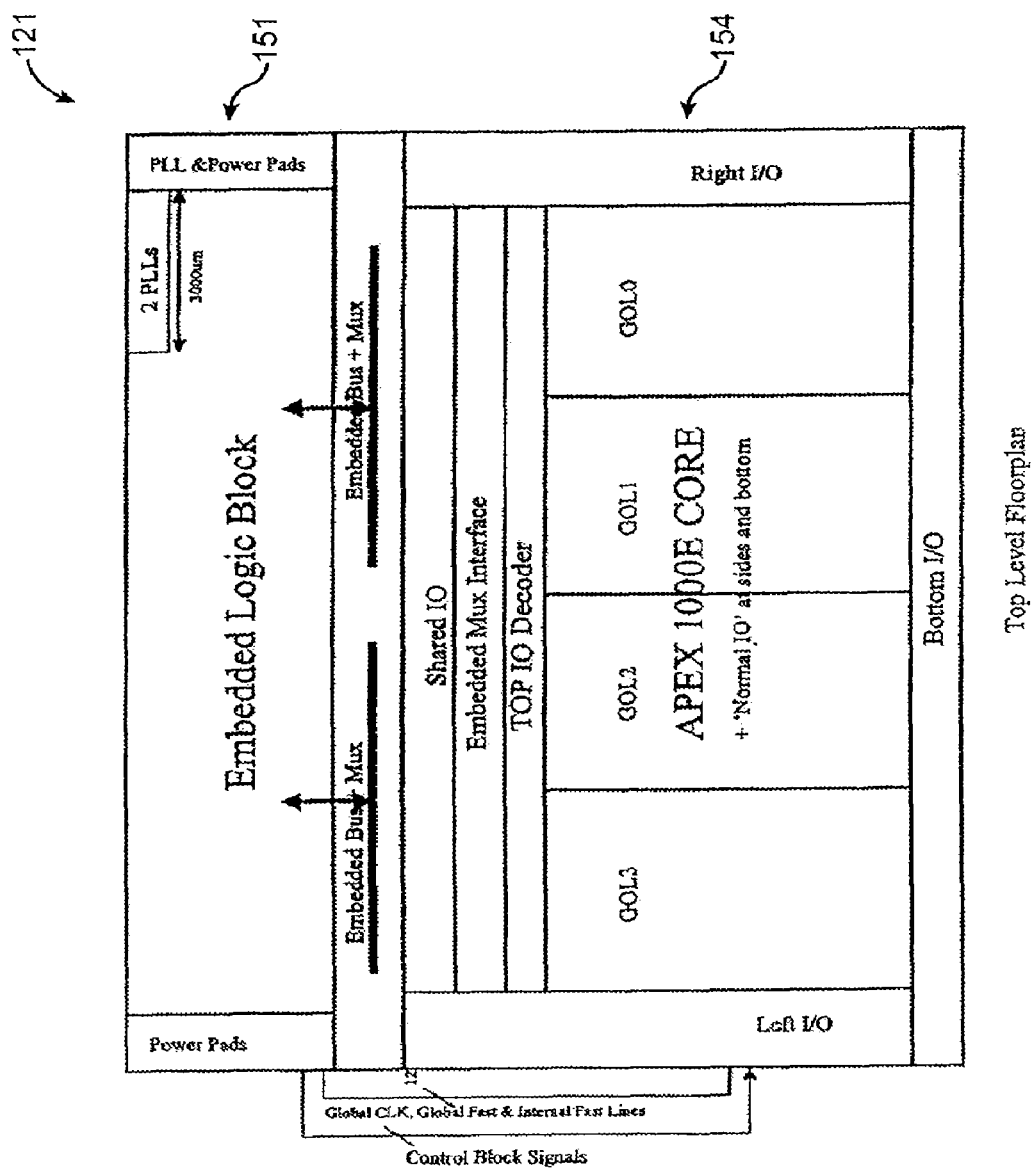
FIG. 2 is a diagram showing a floor plan of a programmable logic integrated circuit with an embedded processor.

FIG. 2 is a diagram showing a floorplan architecture or layout of a programmable logic integrated circuit with an embedded processor. In an aspect of the invention, an integrated circuit includes on the same semiconductor substrate, programmable logic and an embedded processor core. The integrated circuit provides a system on a programmable chip (SOPC) architecture. The PLD integrated circuit 121 includes an embedded logic block portion 151 and programmable logic potion 154. The embedded logic block is the portion of the integrated circuit containing an on-chip or embedded processor core. This embedded processor portion may also be referred to as a "stripe" because it occupies a stripe along an entire edge of the layout of the chip; this stripe is adjacent to the programmable logic portion. In the embodiment of FIG. 2, the stripe is located along one edge of the integrated circuit. In other embodiments, the embedded processor portion may be organized in a shape other than a stripe, and may not run the entire length of the integrated circuit. Further, the embedded processor portion may not be positioned along an edge of the integrated circuit, but may be within or internal to the integrated circuit. For example, in a specific embodiment, the processor portion may be totally enclosed within the programmable logic portion.

In brief, the embedded processor core portion of the integrated circuit includes an on-chip RAM section, ARM or MIPS CPU (central processing unit) section, cache section (for the CPU), external bus interface section, and a universal asynchronous receiver-transistor (UART) section. The CPU section has a JTAG/debug external interface. The external bus interface can interface to external devices. The UART can interface with a serial port and facilitate asynchronous serial communication. In other embodiments of the invention, the integrated circuit may also support universal serial bus (USB) communication or IEEE 1394 communication (also known as Fire Wire), or both. In a specific embodiment, the CPU is an ARM922T 32-bit RISC processor core.

In other embodiments, the CPU may be a MIPS core such as the MIPS32 4Kc 32-bit RISC processor core. The embedded processor core portion is positioned above the top I/Os of the programmable logic portion. The programmable logic portion has I/Os in a ring around it, including right and left I/Os and bottom I/O. The top I/Os are referred to as shared I/Os because these are I/Os that are shared by both the processor and programmable logic of the integrated circuit. In other words, either the processor or programmable logic portions may input data or output data, or both, using the shared I/Os.

The programmable logic portion of the integrated circuit may be sometimes referred to as the PLD portion of the integrated circuit because it contains the programmable logic of the integrated circuit. The programmable logic portion includes features that are discussed in more detail below. In a particular implementation, the programmable logic portion of the integrated circuit is similar to the APEX 20K architecture, and in particular the APEX 20K0000E (also know as the APEX1000E core) device. For the APEX20K architecture, the programmable logic is configured by programming SRAM memory cells, which are volatile memory cells. Volatile memory cells do not retain their stored state when power is removed. Therefore, these types of memory cells need to be reprogrammed upon power-up of the chip. Other programmable logic integrated circuits use nonvolatile memory cells, such as floating gate cells or Flash cells. These programmable logic architectures may also be used to implement a programmable logic integrated circuit with embedded processor. Nonvolatile memory cells will not need to be reprogrammed upon power-up since they retain their stored states even after power is removed.

One technique of implementing a programmable logic integrated circuit with embedded processor is to take an existing programmable logic integrated circuit design without an embedded processor stripe, and add this stripe to the layout. In other words, the programmable logic integrated circuit is stretched to include the stripe. Wiring is disconnected and reconnected in order so the processor and programmable logic portions may communicate with each other and the outside world. The entire integrated with the stripe is then fabricated.

Among the many advantages of this technique is that the programmable logic integrated circuit can be implemented relatively quickly without extensive modification to the programmable logic portion. The programmable logic portion is already debugged. There is software to configure the programmable logic. And users are already familiar with the architecture of the programmable logic portion. In certain embodiments, the stripe adds some die size, but does not require extra pads or pins. So the entire die with the stripe may still fit within the same package size as the original programmable-logic-only integrated circuit. A further advantage of this technique is that the stripe can be designed separately from the programmable logic. This stripe may be standardized and licensed or sold to programmable logic manufacturers so that they may more easily create a programmable logic integrated circuit with embedded processor.

Figure 3:
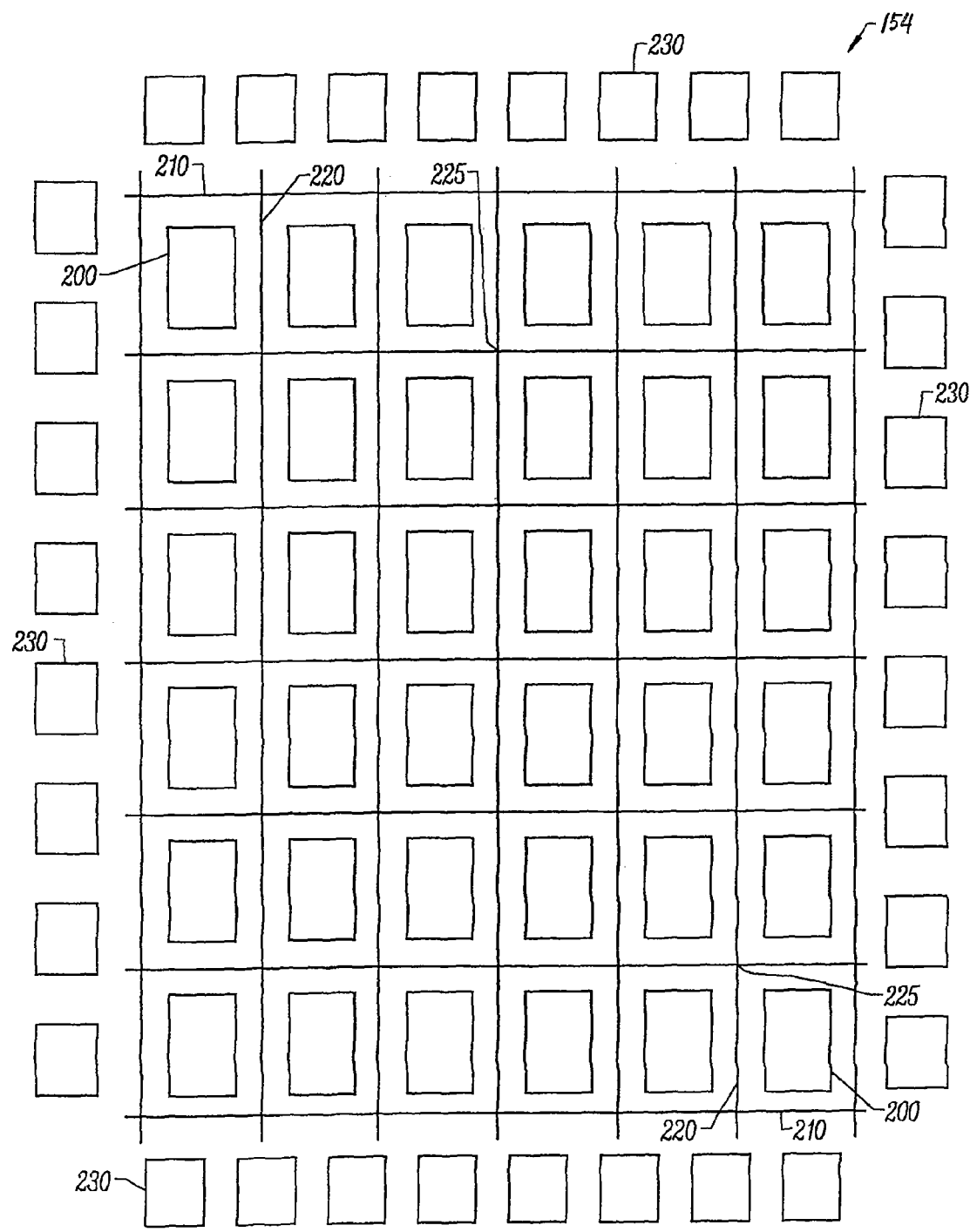
FIG. 3 is a diagram showing the programmable logic portion of the programmable logic integrated circuit.

FIG. 3 is a simplified block diagram of an overall internal architecture and organization of PLD portion 154 of FIG. 2. Many details of programmable logic architecture, organization, and circuit design are not necessary for an understanding of the present invention and such details are not shown in FIG. 3.

FIG. 3 shows a six-by-six two-dimensional array of thirty-six logic array blocks (LABs) 200. LAB 200 is a physically grouped set of logical resources that is configured or programmed to perform logical functions. The internal architecture of a LAB will be described in more detail below in connection with FIG. 4. The programmable logic portion may contain any arbitrary number of LABs, more or less than shown in PLD portion 154 of FIG. 3. Generally, in the future, as technology advances and improves, programmable logic devices with greater numbers of logic array blocks will undoubtedly be created. Furthermore, LABs 200 need not be organized in a square matrix or array; for example, the array may be organized in a five-by-seven or a twenty-by-seventy matrix of LABs.

LAB 200 has inputs and outputs (not shown) which may or may not be programmably connected to a global interconnect structure, comprising an array of global horizontal interconnects (GHs) 210 and global vertical interconnects (GVs) 220. Although shown as single lines in FIG. 2, each GH 210 and GV 220 line may represent a plurality of signal conductors. The inputs and outputs of LAB 200 are programmably connectable to an adjacent GH 210 and an adjacent GV 220. Utilizing GH 210 and GV 220 interconnects, multiple LABs 200 may be connected and combined to implement larger, more complex logic functions than can be realized using a single LAB 200.

In one embodiment, GH 210 and GV 220 conductors may or may not be programmably connectable at intersections 225 of these conductors. Moreover, GH 210 and GV 220 conductors may make multiple connections to other GH 210 and GV 220 conductors. Various GH 210 and GV 220 conductors may be programmably connected together to create a signal path from a LAB 200 at one location of PLD portion 154 to another LAB 200 at another location of PLD portion 154. A signal may pass through a plurality of intersections 225. Furthermore, an output signal from one LAB 200 can be directed into the inputs of one or more LABs 200. Also, using the global interconnect, signals from a LAB 200 can be fed back into the same LAB 200. In specific embodiments of the present invention, only selected GH 210 conductors are programmably connectable to a selection of GV 220 conductors. Furthermore, in still further embodiments, GH 210 and GV 220 conductors may be specifically used for passing signal in a specific direction, such as input or output, but not both.

In other embodiments, the programmable logic integrated circuit may include special or segmented interconnect that is connected to a specific number of LABs and not necessarily an entire row or column of LABs. For example, the segmented interconnect may programmably connect two, three, four, five, or more LABs.

The programmable logic architecture in FIG. 3 further shows at the peripheries of the chip, input-output drivers 230. Input-output drivers 230 are for interfacing the PLD to external, off-chip circuitry. FIG. 3 shows thirty-two input-output drivers 230; however, a programmable logic integrated circuit may contain any number of input-output drivers, more or less than the number depicted. As discussed above, some of these input-output drivers may be shared between the embedded processor and programmable logic portions. Each input-output driver 230 is configurable for use as an input driver, output driver, or bidirectional driver. In other embodiments of a programmable logic integrated circuit, the input-output drivers may be embedded with the integrated circuit core itself. This embedded placement of the input-output drivers may be used with flip chip packaging and will minimize the parasitics of routing the signals to input-output drivers.

Figure 4:
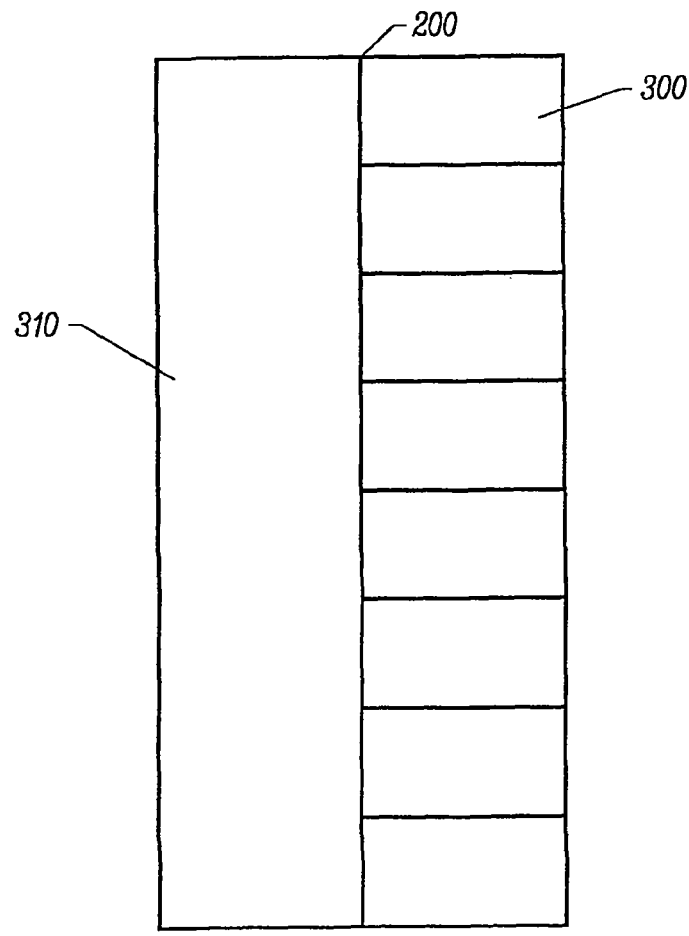
FIG. 4 is a simplified block diagram of a logic array block (LAB).

FIG. 4 shows a simplified block diagram of LAB 200 of FIG. 3. LAB 200 is comprised of a varying number of logic elements (LEs) 300, sometimes referred to as "logic cells," and a local (or internal) interconnect structure 310. LAB 200 has eight LEs 300, but LAB 200 may have any number of LEs, more or less than eight.

A general overview of LE 300 is presented here, sufficient to provide a basic understanding of the present invention. LE 300 is the smallest logical building block of a PLD. Signals external to the LAB, such as from GHs 210 and GVs 220, are programmably connected to LE 300 through local interconnect structure 310. In one embodiment, LE 300 of the present invention incorporates a function generator that is configurable to provide a logical function of a number of variables, such a four-variable Boolean operation. As well as combinatorial functions, LE 300 also provides support for sequential and registered functions using, for example, D flip-flops.

LE 300 provides combinatorial and registered outputs that are connectable to the GHs 210 and GVs 220, outside LAB 200. Furthermore, the outputs from LE 300 may be internally fed back into local interconnect structure 310; through local interconnect structure 310, an output from one LE 300 may be programmably connected to the inputs of other LEs 300, without using the global interconnect structure's GHs 210 and GVs 220. Local interconnect structure 310 allows short-distance interconnection of LEs, without utilizing the limited global resources, GHs 210 and GVs 220.

Figure 5:
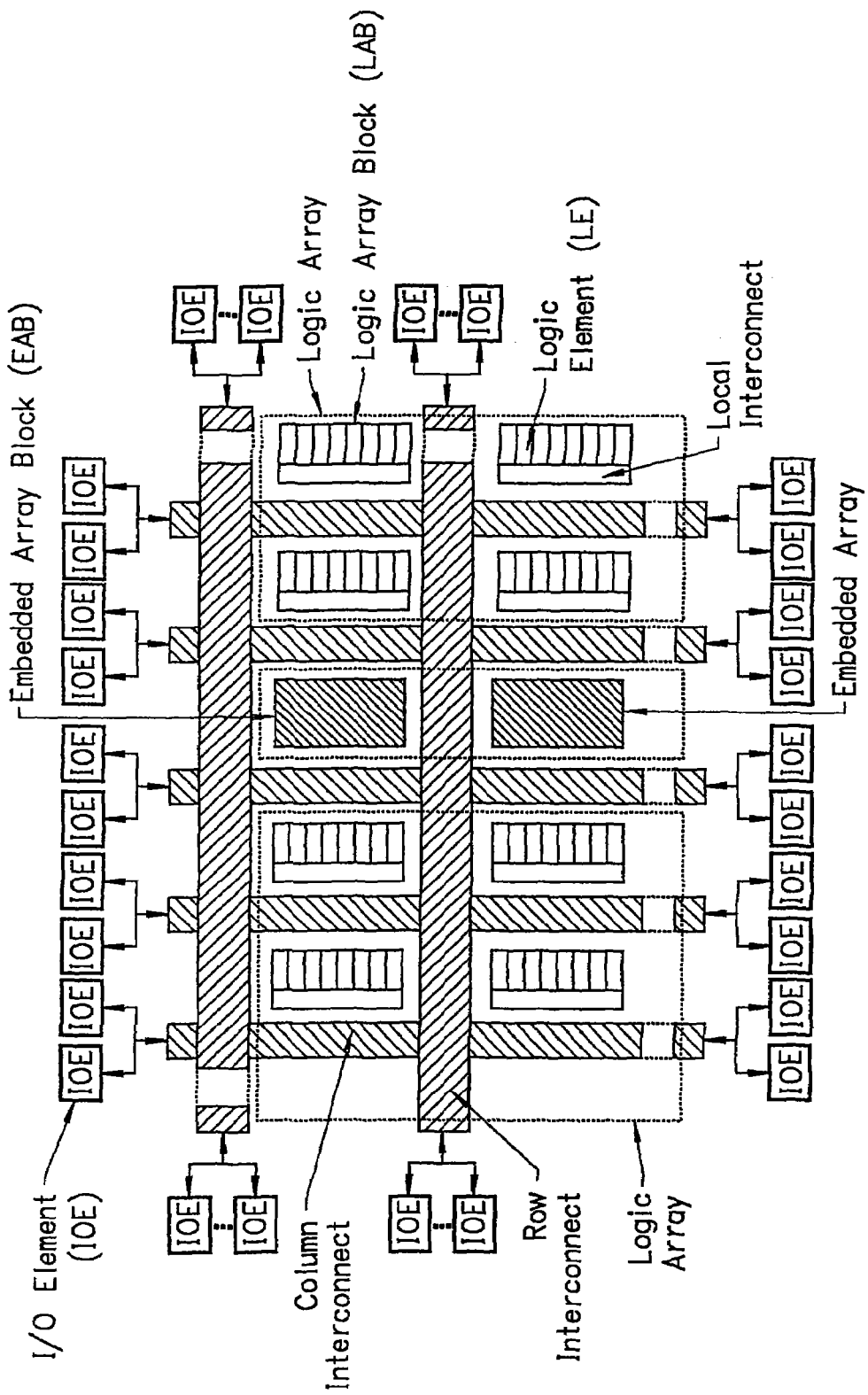
FIG. 5 shows an architecture of a programmable logic integrated circuit with embedded array blocks (EABs).

FIG. 5 shows a programmable logic architecture similar to that in FIG. 3. The architecture in FIG. 5 further includes embedded array blocks (EABs). EABs contain user memory, a flexible block of RAM. More discussion of this architecture may be found in the *Altera Data Book* (1999) in the description of the FLEX 10K product family and also in U.S. Pat. No. 5,550,782, which are incorporated by reference.

Figure 6:
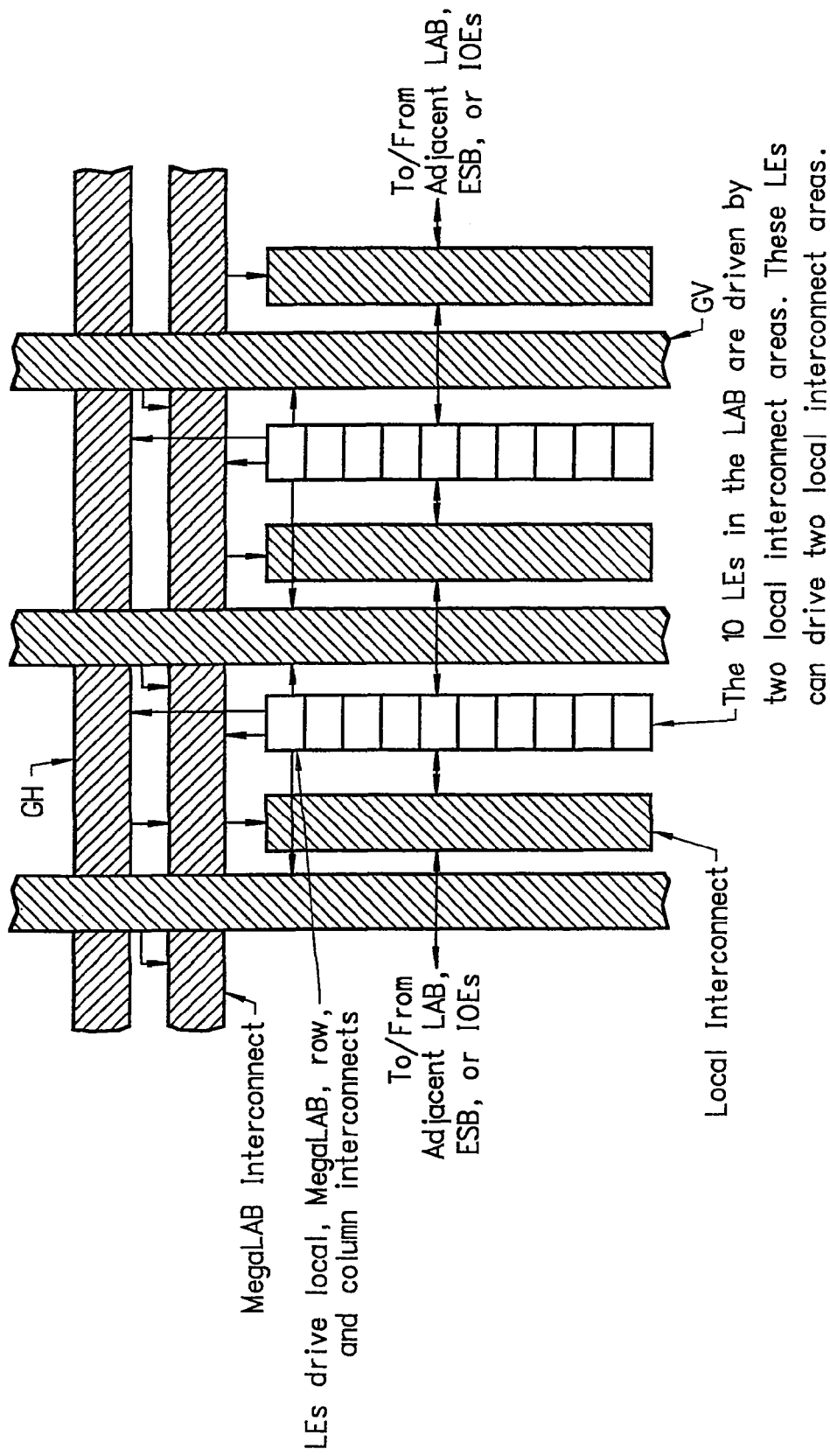
FIG. 6 shows an architecture of a programmable logic integrated circuit with megaLABs.

FIG. 6 shows a further embodiment of a programmable logic integrated circuit architecture. FIG. 6 only shows a portion of the architecture. The features shown in FIG. 6 are repeated horizontally and vertically as needed to create a PLD portion of any desired size. In this architecture, a number of LABs are grouped together into a megaLAB. In a specific embodiment, a megaLAB has sixteen LABs, each of which has ten LEs. There can be any number of megaLABs per PLD portion. A megaLAB is programmably connected using a megaLAB interconnect. This megaLAB interconnect may be considered another interconnect level that is between the global interconnect and local interconnect levels. The megaLAB interconnect can be programmably connected to GVs, GHs, and the local interconnect of each LAB of the megaLAB. Compared to the architecture of FIG. 3, this architecture has an additional level of interconnect, the megaLAB interconnect. Such an architecture is found in Altera's APEX™ family of products, which is described in detail in the *APEX20K Programmable Logic Device Family Data Sheet* (November 1999), which is incorporated by reference. In a specific implementation, a megaLAB also includes an embedded system block (ESB) to implement a variety of memory functions such as CAM, RAM, dual-port RAM, ROM, and FIFO functions.

Figure 7:
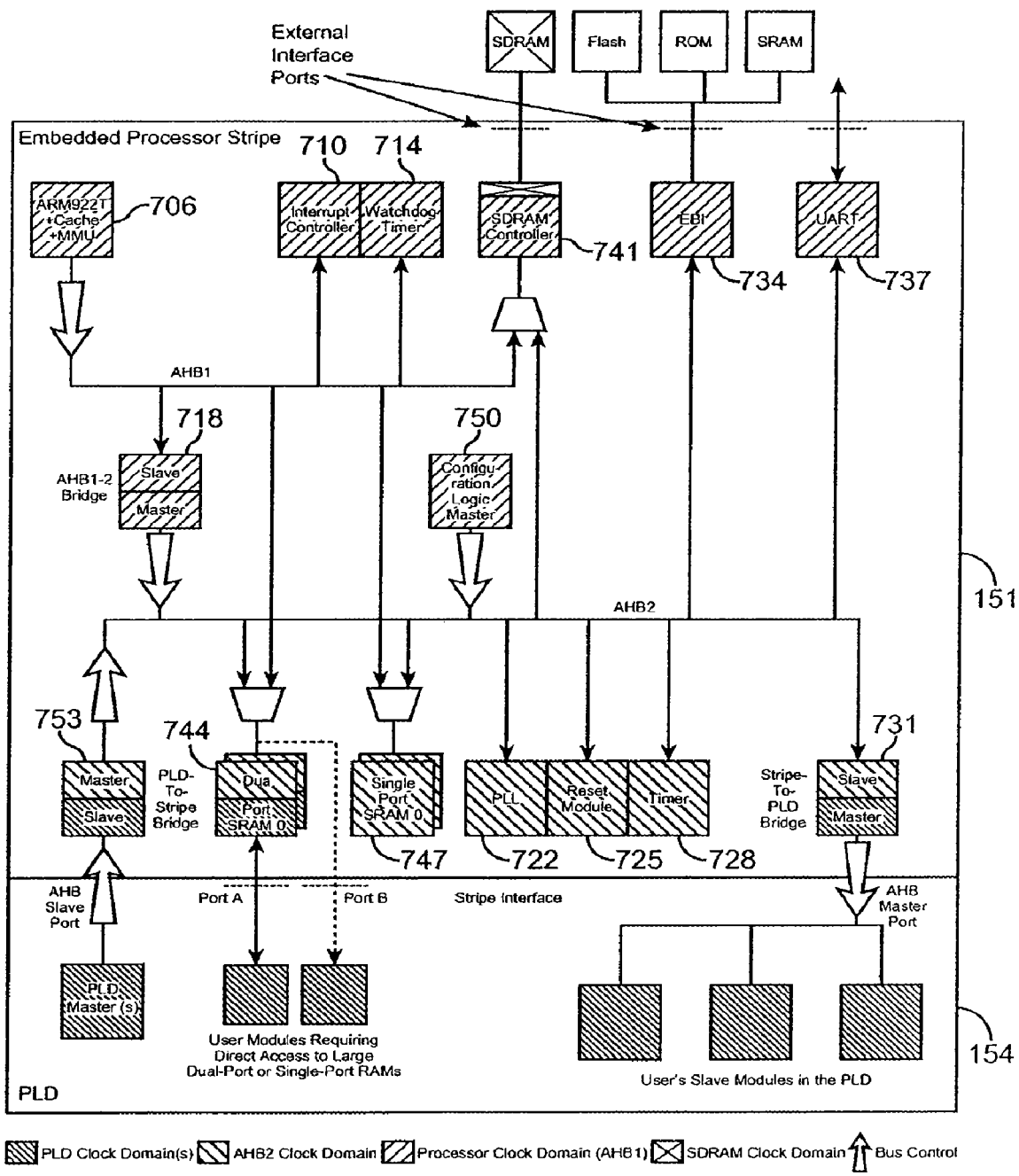
FIG. 7 shows a more detailed block diagram of the embedded processor stripe and the programmable logic portions of the integrated circuit.

FIG. 7 shows a more detailed block diagram of the embedded processor stripe portion 151, and also the programmable logic portion 154 of the integrated circuit. The embedded processor has two buses, AHB1 and AHB2. Two buses are used to ensure the processor 706 activity is unaffected by peripheral and memory operation. Three bidirectional AHB bridges enable the peripherals and programmable logic portion to exchange data with the embedded processor 706. Connected to AHB1 are the processor 706 (e.g., ARM922T), interrupt controller 710, watchdog timer 714, and AHB1-2 bridge 718. Connected to the AHB2 bus are a PLL 722, reset module 725, timer 725, stripe-to-PLD bridge 731, EBI (expansion bus interface) 734, and UART 737. An SDRAM controller 741, dual port SRAM0 744, single port SRAM0 747 are each accessible by either AHB1 or AHB2, selectable by using multiplexers. There are other logic circuits to control the functionality of the stripe including configuration logic master 750 and PLD-to-stripe bridge 753. Further discussion of the bus architecture for a programmable logic integrated circuit with embedded processor is in U.S. patent application Ser. No. 09/668,665, filed Sep. 22, 2000, which is incorporated by reference. Further discussion of additional features of the programmable logic integrated circuit with embedded processor may be found in U.S. patent application Ser. Nos. 09/668,704 and 09/668,202, both filed Sep. 22, 2000, which are incorporated by reference.

Figure 8:
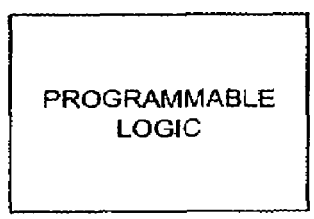
FIG. 8 shows a layout for a programmable logic integrated circuit without an embedded processor portion.
Figure 9:
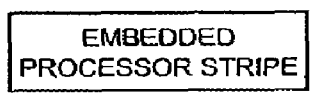
FIG. 9 shows a layout for an embedded processor stripe.
Figure 10:
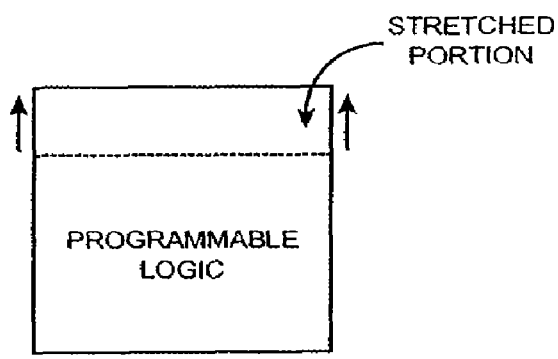
FIG. 10 shows a stretched layout for a programmable logic integrated circuit without an embedded processor portion.
Figure 11:
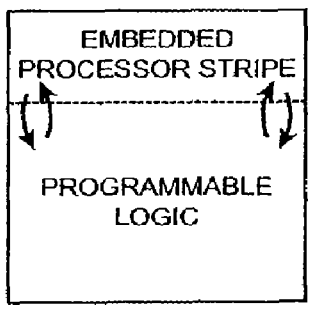
FIG. 11 shows a layout for a programmable logic integrated circuit with an embedded processor portion placed in a stretched section.

FIGS. 8 through 11 illustrate a technique of designing a programmable logic integrated circuit with an embedded processor section. FIG. 8 shows a layout of a programmable logic integrated circuit, without an embedded processor, that is used as a starting point. Then, as FIG. 10 shows, this layout is stretched using one edge. In the stretched potion, the embedded processor portion is laid out. And, as shown in FIG. 11, signal lines between the embedded processor and programmable logic portions are interconnected. For example, some lines in the programmable logic portion may be disconnected or broken and connected to signal lines in the embedded processor portion, and then a signal line from the embedded processor portion is connected to the broken line. These signal lines allow communication and interaction between the embedded processor and programmable logic portions, and also allow communication and interaction with off-chip devices.

In an alternative embodiment, instead of building the embedded processor section in the stretched area, the embedded processor stripe has been previously laid out as shown in FIG. 9. Then, this stripe is then placed into the stretched section of the programmable logic layout. And, the signal lines are interconnected to allow communication and interaction between the embedded processor and programmable logic portions. This embodiment of the invention may be useful for taking a standard embedded processor strip and using it with a variety of programmable logic integrated circuit products or architectures. Furthermore, the embedded processor stripe may be designed as a circuit block to be incorporated with a programmable logic chip. The embedded processor would be intellectual property that may be licensed or sold to any programmable logic vendor who desires to manufacture a system on a programmable chip with a particular, possibly proprietary, programmable logic architecture, without the need to design the embedded processor section themselves.

In a specific embodiment, to allow room for the embedded processor, the programmable logic-only integrated circuit is stretched by about 12 percent, compared to its original length. The exact length a layout needs to be stretched depends on a number of factors including the width of the die, architecture of the embedded processor, process technology used, and layout of the programmable logic portion. For example, the die may be stretched about 10 percent or more in other embodiments. It is desirable to minimize the amount stretched since this will save die size. The embedded processor stripe is placed in the stretched portion.

Furthermore, in a specific embodiment, an area of the programmable-logic-only integrated circuit is about 461,000K square microns. An area of the embedded processor stripe is about 56,500K square microns. So, a total die size of the programmable logic integrated circuit with embedded processor is about 517,500K square microns. The embedded processor portion occupies about 11 percent of the total die size. The embedded processor stripe increases the die size of the programmable-logic-only integrated circuit by about 12 percent.

In this embodiment, the programmable logic portion provides 263,000 system gates for use. The typical gates will be about 100,000. There will be about 4160 logic elements, 26 ESBs, 53,248 RAM bits, 416 macrocells, and 178 user I/O pins. Other embodiments may have more or less programmable logic. For example, another embodiment will provide programmable logic having about 1,052,000 system gates, 400,000 typical gates, 16,640 LEs, 104 ESBs, 212,992 RAM bits, 1664 macrocells, and 360 user I/O pins. In a further embodiment, the programmable logic will provide about 1,772,000 system gates, 1,000,000 typical gates, 38,400 LEs, 160 ESBs, 327,680 RAM bits, 2560 macrocells, and 521 user I/O pins.

The above implementations would provide an embedded processor on the same integrated circuit as the programmable logic. Generally, as the amount of programmable logic increases, the amount of memory provided in the embedded processor portion also increases. For example, for 263K gates and 53K RAM bits, the processor stripe would provide about 16K bytes of single-port SRAM memory and about 16K bytes of dual-port SRAM memory. For 1052K gates and 213K RAM bits, the single-port SRAM memory will be about 128K bytes and dual-port SRAM memory will be about 64K bytes. And for 1772K gates and 328K bytes RAM bits, the single-port SRAM memory will be about 256K bytes and the dual-port SRAM will be about 128K bytes.

The numbers provided above give merely an example of some implementations for a system on a programmable chip architecture. These implementations are relatively compact and efficient; these programmable integrated circuits provide greater functionality while increasing die size slightly. In an embodiment, the die of the programmable logic and processor will fit in the same package as the original programmable-logic-only integrated circuit. For example, the package is a 484-pin ball-grid-array (BGA) package having a pitch of 1 millimeter and an area of 529 square millimeters.

Figure 12:
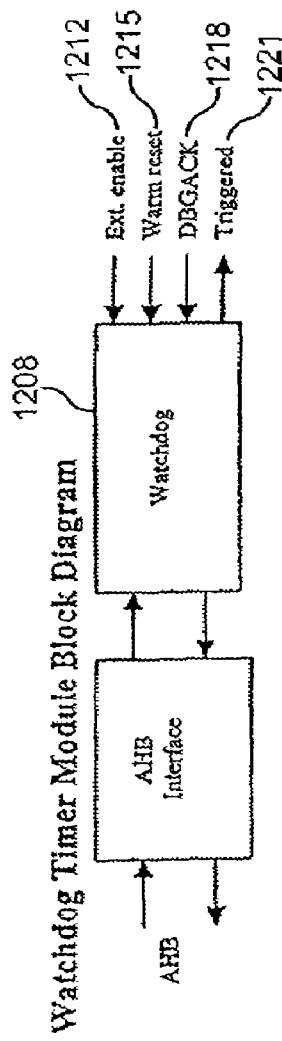
FIG. 12 shows a more detailed block diagram of the watchdog timer circuit.

FIG. 12 shows a more detailed block diagram of the watchdog timer circuit. The watchdog timer circuitry 1208 interfaces with the AHB1 bus interface to connect to the AHB1 bus. A programmable logic integrated circuit with embedded processor circuitry is configured differently from previous programmable-logic-only integrated circuits. In an embodiment, the programmable logic integrated circuit includes programmable logic that is volatile, such as SRAM-based programmable logic. Such programmable logic integrated circuits are configured or programmed using an external source such as a serial memory or other configuration device. This external configuration device is sometimes called an EPC (erasable programmable configuration device). A discussion of configuring programmable logic devices is found in U.S. Pat. No. 6,052,755, which is incorporated by reference. Data from the EPC is transferred and loaded into PLD upon power-up. This is sometimes referred to as a power-on reset operation. The configuration data is typically transferred in a bitstream form, although it may also be passed in many other forms, such as in parallel, interleaved, or daisy chained. For example, the configuration bits may be passed through multiple programmable logic integrated circuits with embedded processor blocks. This bitstream contains the information that configures the programmable logic of the PLD as desired by the user.

For a PLD with embedded processor, the bitstream configures both the programmable logic portion and the embedded processor portion. In an embodiment, the bitstream has the capability to initialize program and data memory for the embedded processor and system resources before the processor is released from reset (i.e., before the processor begins normal operation). A problem that may occur when operating a programmable logic integrated processor with an embedded processor include corruption of the memory or data. This may be caused by a software failure or hardware failure.

The watchdog timer module protects the system against software failure or against severe hardware failures such as lockups due to power supply problems. In short, it is a one-shot timer that resets the entire chip when it expires. It should be regularly reloaded or reset by software to allow normal operation.

The watchdog timer circuitry is typically included in the embedded processor stripe portion of the integrated circuit. But in other embodiments, the watchdog timer circuit may be included anywhere on the integrated circuit, including the programmable logic portion.

In a specific implementation, the watchdog timer circuit includes a 32-bit register interface, timeouts of up to 30 seconds with a 33 megahertz clock, and cannot be accidentally disabled by software.

Figure 13:
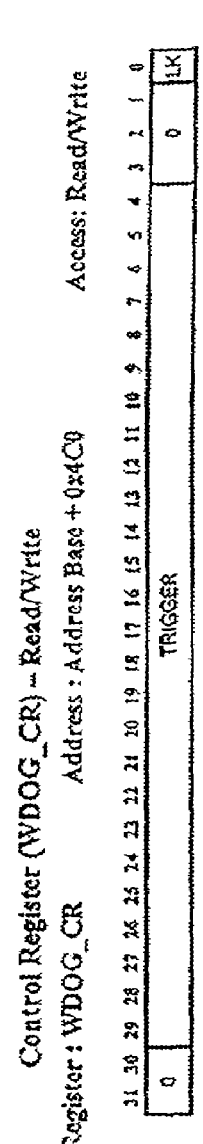
FIG. 13 shows a control register for the watchdog timer circuit.
Figure 14:
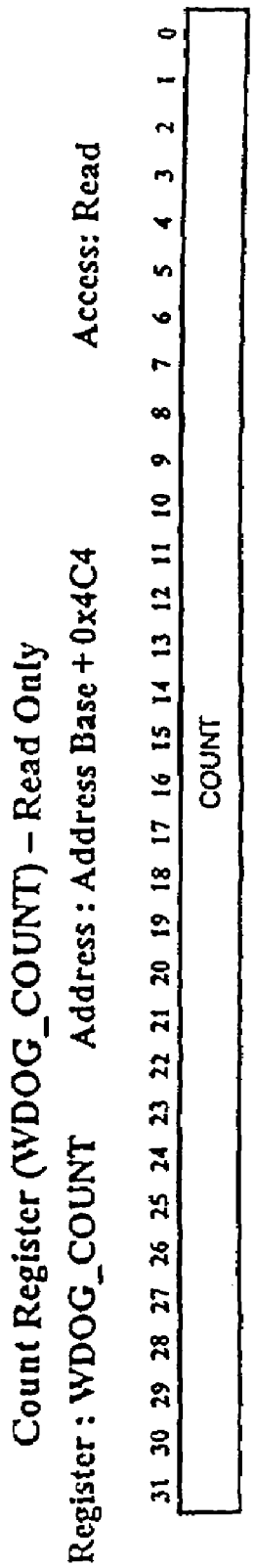
FIG. 14 shows a count register for the watchdog timer circuit.
Figure 15:
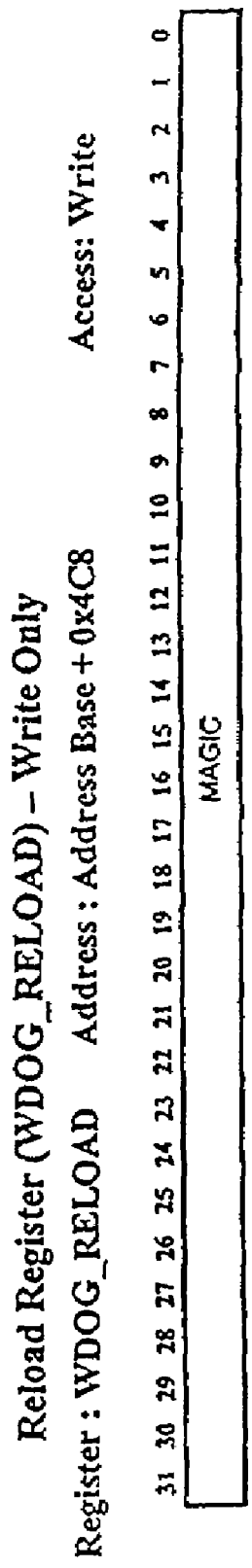
FIG. 15 shows a reload register for the watchdog timer circuit.

The watchdog timer circuit has inputs: external enable 1212, warm reset 1215, DBGACK 1218. The watchdog timer circuit has a triggered output 1221. The watchdog timer circuit includes three registers, a control register (shown in FIG. 13), a count register (shown in FIG. 14), and a reload register (shown in FIG. 15).

An external pin is used to perform a watchdog external enable 1212 function. The watchdog module is reset by the warm reset line 1215. Triggered signal 1221 informs the reset module or reset circuit block that the watchdog timer has been triggered. The reset module is a circuit block that resets the programmable logic integrated circuit and starts the process of reloading configuration data into the integrated circuit. The reset module will handle handshaking with the external EPC device to start and facilitate transfer of configuration data from the EPC to the programmable logic integrated circuit. The fact that the watchdog timer has been triggered is latched into a reset status register and the triggered signal is cleared by asserting the warm reset line.

The watchdog counter register is 32-bits wide and is incremented by using a clk_ref input. The DBGACK signal stops this counter unless external enable 1212 is active.

When the external watchdog enable pin is asserted high the watchdog will trigger when the count register overflows. This will enforce a maximum count value. The duration of this maximum count depends on the input frequency. For example, for a 10 megahertz clock, this time period is 1¾ minutes and for a 100 megahertz clock, the time period is 10 seconds.

If the software watchdog circuit is enabled and the processor is not in debug mode (as determined by the DBGACK signal) then the watchdog will trigger when the count is equal to a programmed value. Debug mode is used to troubleshoot the operation of the integrated circuit. For example, the user can single-step the processor during debug mode. Generally, the watchdog timer is disabled during debug mode.

When the watchdog triggers, it will set the triggered bit and assert the trigger output. This signal will make the reset block reset all modules within the programmable logic integrated circuit except for the trace logic. It will also provide a reset signal to external devices. If the boot source was not a Flash memory, then the watchdog reset should cause a new code download.

Two magic values can be written to the reload register. In a specific implementation, these magic values are 0xA5A5A5A5 and 0x5A5A5A5A, given in hexadecimal format. However, in other implementations, other predetermined or selected values may be used as magic values. At any time the watchdog circuitry expects one of these values to be next. Writing any value other than the expected value triggers the watchdog.

Writing the value the watchdog expects makes the watchdog expect the other value. In addition, if the value written was 0x5A5A5A5A then the watchdog counter will be reset to 0. In embodiments of the invention, a single magic value or multiple magic values may be used. For example, two, three, four, five, or more magic values may be used. The specific magic values may be predetermined or user-defined.

If a lock bit of the control register is set to 1, then further writes to this register have no effect. This can be used to prevent the watchdog timer circuit from being disabled by software once it has been enabled.

The warm reset signal resets everything within the watchdog to its initial state. The reset module latches the triggered signal so that software can determine the cause of a reset.

Below is a table summarizing operation of this particular embodiment of the watchdog timer circuit. "X" denotes a don't care.

Watchdog Timer Circuit
Summary of Operation Table

| Warm Reset | Ext. Enable | Debug Mode DBGACK | Operation |
|---|---|---|---|
| 0 | 1 | 0 | Watchdog timer triggers when count register overflows (i.e., count equals maximum value). |
| 0 | X | 1 | Disable watchdog timer. |
| 0 | 0 | 0 | If watchdog timer is software enabled, as determined by the contents of the control register, the watchdog timer circuit will trigger when the count is equal to the programmed value, held in control register. |
| 1 | X | X | If watchdog timer has been triggered, as indicated by a reset status register, warm-reset clears the triggered condition. |

The registers of the watchdog circuit are 32 bit. For the control register (shown in FIG. 13), when a LK bit is 1, further writes to this register have no effect. For TRIGGER of 0, this means the watchdog is disabled. Other values specify bits 29:4 of the trigger value. Bits 3:0 of the trigger are always zero in a specific implementation. Bits 31:32 are reserved for future use; they are written with 0 to ensure future compatibility.

Writing to this register when the LK bit is set causes a bus error and does not modify the register contents. Writing to this register sets the expected value to 0xA5A5A5A5 if the LK bit is not set. A read from this register has no side effects.

The count register (shown in FIG. 14) of the watchdog timer circuit is used to hold the current value of the watchdog timer circuit. It may be incremented or decremented depending on the particular implementation. When the count reaches a maximum value or other predetermined value before a reload occurs, then the watchdog will assert the triggered output; this resets the programmable logic integrated circuit. There are no side effects associated with a read or write to this register.

The reload register (shown in FIG. 15) is used to reload the watchdog timer circuit. Unless a reload is done periodically, the watchdog timer circuitry will assert the triggered signal, which in turn resets the programmable logic integrated circuit. Writing a sequence of magic values to this register will reset the watchdog count register (e.g., reset the count register to an initial value such as 0), so that the count register does not reach the maximum value or final value. By continually reloading the watchdog timer circuit, a triggered condition will not occur because the count register never reaches the final value that causes a triggered condition. In an embodiment, writing an incorrect value into this register will trigger the watchdog time circuitry.

The above-described specific implementation uses 32-bit registers. However, other implementations may use registers having more or fewer bits. For example, the register may have 8 bits, 16 bits, 20 bits, 36 bits, 40 bits, or 64 bits. Furthermore, the watchdog timer circuit is described as having three registers. Other implementation may have fewer or more than three registers. For example, one register may be combined or shared with another register to serve multiple purposes. Furthermore, the registers may not be part of the watchdog timer circuit, and may be part of circuitry on another part of the integrated circuit. For example, one of the registers may be implemented in the programmable logic portion of the integrated circuit.

Figure 16:
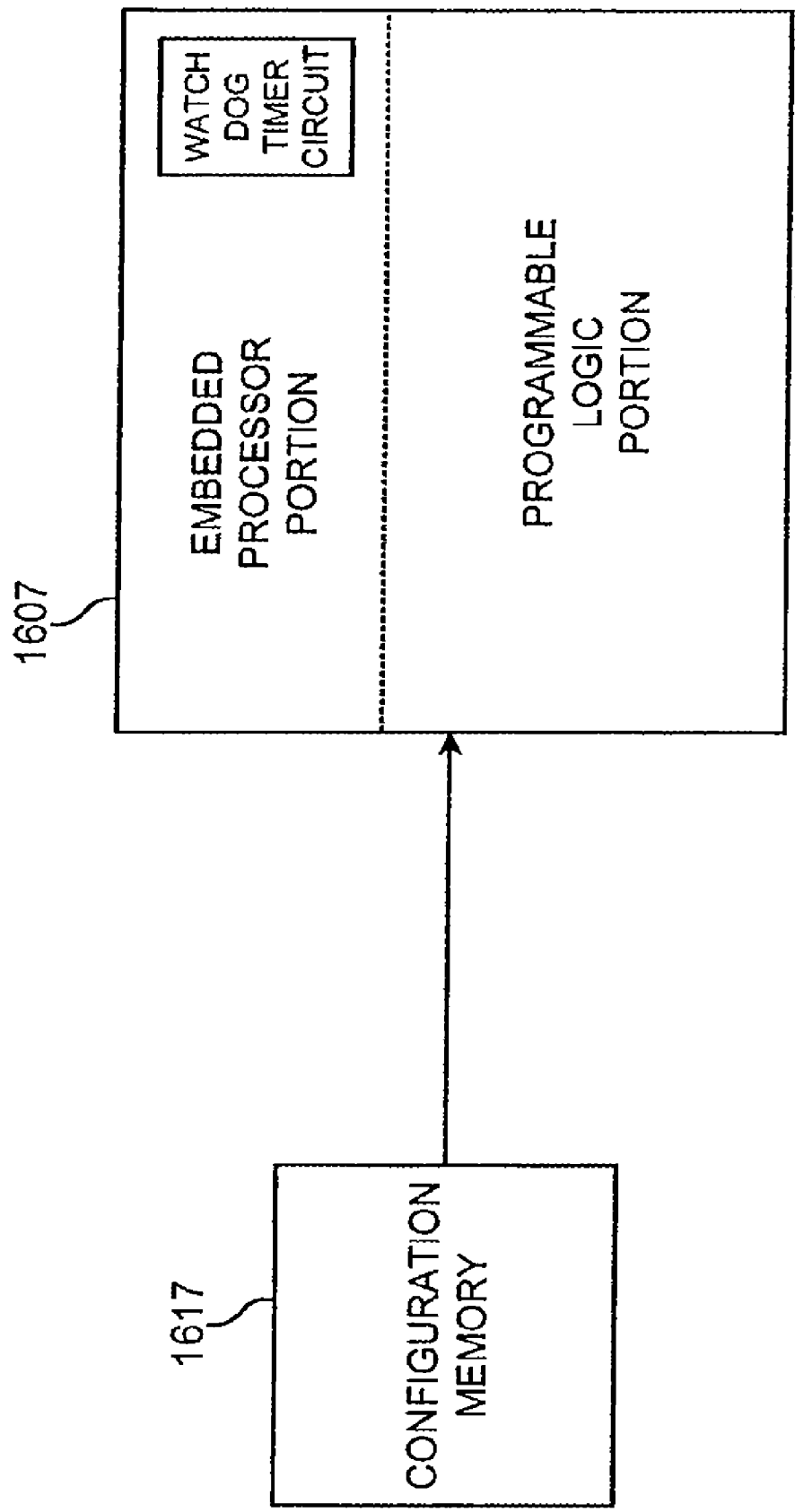
FIG. 16 shows configuration of a programmable logic integrated circuit with embedded processor using an external configuration memory.

FIG. 16 shows a programmable logic integrated circuit 1607 with an embedded processor portion and a programmable logic portion. The embedded processor portion includes the watchdog timer circuit. Once the watchdog timer circuit gets triggered by some event because software fails to reload the reload counter with a magic value within a timeout period. The timeout period is the time the count register takes to count from the initial value to the final value. As discussed above, this time varies depending on the frequency of the clock as well as the size of the register. The software that is used to reload the counter may be part of an interrupt routine. Once the watchdog is triggered, the programmable logic integrated circuit gets reset and configuration data is reloaded from an external source such as a configuration memory 1617. Some examples of a configuration memory may be a serial EPROM, Flash memory, or other nonvolatile storage device. The configuration data is usually transferred to the programmable logic integrated circuit using a stream of bits. This stream of configuration bits is used to configure the programmable logic and embedded processor portions of the integrated circuit.

A reset condition for the programmable logic integrated circuit may occur under other circumstances and does not occur only because it is being triggered by the watchdog timer circuitry. For example, a power-on reset condition, where power is initially supplied to the integrated circuit, would also cause a reset condition and loading of configuration data into the integrated circuit.

Figure 17:
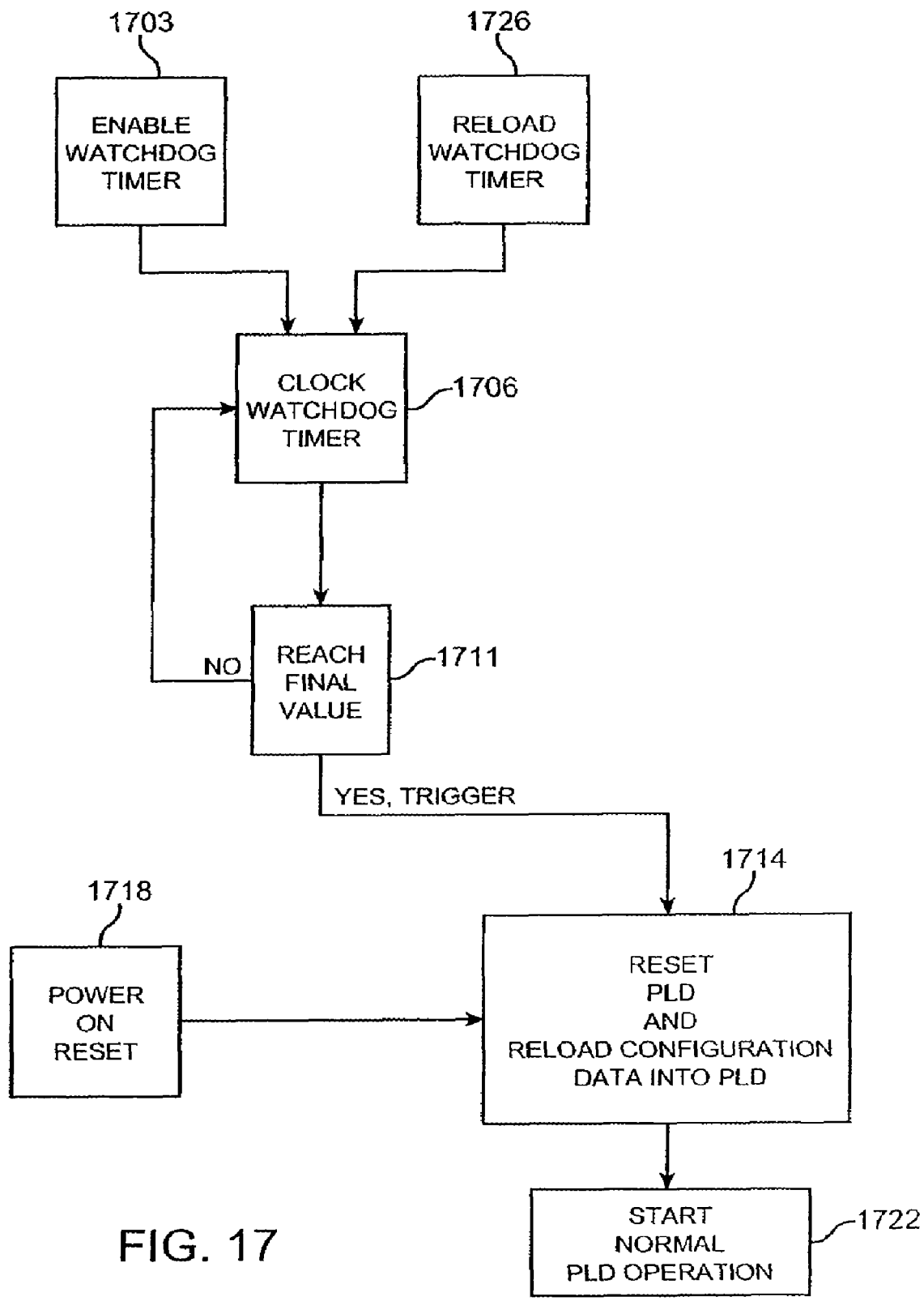
FIG. 17 shows a flow diagram of the operation of the watchdog timer circuit.

FIG. 17 shows a flow diagram of the operation of the watchdog time circuit. The watchdog timer circuitry is enabled (box 1703). When enabled, a count register is loaded with a starting value. Then, the count register of the watchdog timer circuitry begins counting (box 1706). As long as the value in the count register is not equal to a final value (box 1711), the watchdog timer circuitry continues to count. This final value may be any value such as a value that causes the count register overflow or the maximum value permitted in the count register. If the count register reaches the final value, then the watchdog timer circuitry generates the triggered signal. This triggered signal is connected and passed to the reset logic block (box 1714) that resets the programmable logic integrated circuit. Another condition that might cause the reset condition is a power-on reset situation (box 1718). During the reset condition, configuration data for the programmable logic integrated circuit is reloaded into the integrated circuit. The source of this configuration data may be an external nonvolatile memory. This configuration configures the programmable logic and embedded processor portions of the integrated circuit. After the configuration data is loaded, the programmable logic integrated circuit goes into normal operation (box 1722).

To prevent the watchdog timer circuitry from becoming triggered, the watchdog timer circuitry must be periodically reloaded or reset (box 1726). This reload must occur before a timeout period. The timeout period is the period of time it takes to count from an initial value stored in the count register to reach the final value. A reload may be indicated by loading a reload register with appropriate magic values. This will reset the count register to the initial value, and counting will continue from this initial value. The initial value may or may not be the same value as the starting value used when enabling the watchdog timer. For example, in one embodiment, the starting and initial values are 0. The count register may be zeroed using a reset function.

The watchdog timer circuitry of the invention is useful in detecting software problems, hardware problems (e.g., power supply problem), or other conditions that cause the logic to fail to periodically reload the watchdog timer. For example, the embedded processor of the integrated circuit may be hung or in a loop. Another potential condition that may cause the integrated circuit to hang is a low voltage situation where data on the integrated circuit is corrupted. The watchdog timer circuitry of the invention handles situations such as these. The watchdog timer circuit is not limited to detecting software and power supply problems, but also protects against more general hardware problems including design problems that cause the programmable logic to lock up. When a reload of the watchdog timer circuitry does not occur within the timeout period, the watchdog timer circuitry will cause the entire programmable logic integrated circuit to be reset. This will reload the configuration data into the integrated circuit. The configuration data is used to configure the embedded processor and programmable logic of the integrated circuit.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A circuit comprising:
a programmable logic integrated circuit comprising an embedded processor portion and a programmable logic portion, wherein the embedded processor portion includes a watchdog timer circuit; and
an external configuration source integrated circuit that is coupled to the programmable logic integrated circuit and that stores configuration information for the programmable logic integrated circuit, wherein when the watchdog timer circuit asserts a triggered signal output due to not reloading the watchdog timer circuit within a timeout period, configuration data is loaded from the external configuration source into the programmable logic integrated circuit.

2. The circuit of claim 1 wherein the external configuration source is a nonvolatile memory.

3. The circuit of claim 1 wherein the watchdog timer circuit is reloaded by periodically loading a reload register of the watchdog timer with one or more magic values.

4. The circuit of claim 1 wherein a configuration of the programmable logic portion of the programmable logic integrated circuit is held using volatile memory cells.

5. The circuit of claim 4 wherein the volatile memory cells are SRAM cells.

6. The circuit of claim 4 wherein configuration data from the external configuration source is used to configure the embedded processor portion and programmable logic portion of the programmable logic integrated circuit.

7. The circuit of claim 1 wherein the configuration is transferred serially from the external configuration source to the programmable logic integrated circuit.

8. The circuit of claim 1 wherein the watchdog timer circuit is not reloaded due to a software failure occurring within the embedded processor portion of the programmable logic integrated circuit.

9. The circuit of claim 1 wherein the watchdog circuit is not reloaded due to a power supply problem.

10. A programmable logic integrated circuit comprising:
a programmable logic portion of the integrated circuit comprising a plurality of logic array blocks, configurable to perform user logic, wherein the logic array blocks are arranged in rows and columns; and
an embedded processor portion of the integrated circuit, coupled to the programmable logic portion, comprising a watchdog timer circuit which is triggered if a count register of the watchdog timer circuit is permitted to count to a final value before the count register is reloaded,
wherein triggering of the watchdog timer circuit is avoided when the watchdog timer circuit is periodically reloaded, before a timeout period by writing a magic value to a reload register, and wherein loading a value other than the magic value also causes the watchdog timer circuit to generate a triggered signal.

11. The programmable logic integrated circuit of claim 10 wherein the timeout period is a time it takes for the watchdog timer circuit to count from an initial value to the final value.

12. The programmable logic integrated circuit of claim 10 wherein the plurality of logic array blocks are configured by programming SRAM memory cells.

13. The programmable logic integrated circuit of claim 10 wherein the plurality of logic array blocks are configured by programming volatile memory cells.

14. The programmable logic integrated circuit of claim 10 wherein the watchdog timer circuit comprises a reload register and a control register.

15. The programmable logic integrated circuit of claim 10 wherein each logic array block comprises a look-up table circuit.

16. The programmable logic integrated circuit of claim 10 wherein the embedded processor portion further comprises a central processing unit and an embedded processor memory block, coupled together using a first bus.

17. The programmable logic integrated circuit of claim 16 wherein the watchdog timer circuit is also coupled to the first bus.

18. The programmable logic integrated circuit of claim 16 wherein the embedded processor further comprises a second bus, through which the memory block is coupled to the programmable logic portion of the integrated circuit.

19. The programmable logic integrated circuit of claim 16 wherein the external source is a Flash memory, EPROM memory, nonvolatile memory, or serial memory.

20. A programmable logic integrated circuit comprising:
a programmable logic portion of the integrated circuit comprising a plurality of logic array blocks, configurable to perform user logic, wherein the logic array blocks are arranged in rows and columns; and
an embedded processor portion of the integrated circuit, coupled to the programmable logic portion, comprising a watchdog timer circuit which is triggered if a count register of the watchdog timer circuit is permitted to count to a final value before the count register is reloaded,
wherein after the watchdog timer circuit is triggered, a reset circuit of the programmable logic integrated circuit effects loading of configuration data from an external source to reconfigure the programmable logic and embedded processor position of integrated circuit.

21. The programmable logic integrated circuit of claim 20 wherein the configuration data is transferred to the programmable logic integrated circuit by using a serial stream of bits.

* * * * *